(12) United States Patent
Bradley

(10) Patent No.: US 6,871,245 B2
(45) Date of Patent: Mar. 22, 2005

(54) FILE SYSTEM TRANSLATORS AND METHODS FOR IMPLEMENTING THE SAME

(75) Inventor: Mark W. Bradley, Boulder, CO (US)

(73) Assignee: Radiant Data Corporation, Niwot, CO (US)

(*) Notice: Subject to any disclaimer, the term of this patent is extended or adjusted under 35 U.S.C. 154(b) by 467 days.

(21) Appl. No.: 09/726,765

(22) Filed: Nov. 29, 2000

(65) Prior Publication Data

US 2002/0065810 A1 May 30, 2002

(51) Int. Cl.[7] .............................................. G06F 13/38
(52) U.S. Cl. ........................... 710/65; 710/66; 710/74; 707/4; 707/203; 709/203; 709/219
(58) Field of Search ........................ 710/62–74; 707/4, 707/203, 1–10, 200–206; 709/203, 219

(56) References Cited

U.S. PATENT DOCUMENTS

| | | | | |
|---|---|---|---|---|
| 5,668,958 A | * | 9/1997 | Bendert et al. ............. 710/305 |
| 5,680,303 A | * | 10/1997 | Libucha et al. ............. 180/167 |
| 5,758,153 A | * | 5/1998 | Atsatt et al. ............ 707/103 R |
| 6,185,580 B1 | * | 2/2001 | Day et al. .................... 707/205 |
| 6,195,650 B1 | * | 2/2001 | Gaither et al. ................. 707/1 |
| 6,279,011 B1 | * | 8/2001 | Muhlestein ................. 707/204 |
| 6,351,750 B1 | * | 2/2002 | Duga et al. ................. 707/102 |
| 6,438,544 B1 | * | 8/2002 | Grimmer et al. ............. 707/5 |
| 6,549,918 B1 | * | 4/2003 | Probert et al. ............. 707/203 |

* cited by examiner

Primary Examiner—Jeffrey Gaffin
Assistant Examiner—Mike Nguyen
(74) Attorney, Agent, or Firm—Martine & Penilla & Gencarella LLP

(57) ABSTRACT

A translation system and method for translating file systems between nodes having heterogeneous file systems are provided. The translation system includes a consumer node having a first file system and a driver for supplementing requests from the first file system to a storage device. Also included in the translation system is an input/output (I/O) node which implements a second file system. The I/O node is connected to the storage device and is in communication with the consumer node over a transport. The I/O node includes a translator layer designed to map the supplemented requests from the first file system to the second file system and back to the first file system.

20 Claims, 13 Drawing Sheets

Directory Class /202

ATTRIBUTES: — 202a

Type
　　Actions Enabled
　　Permissions
　　Owner
　　Group ID
　　Local ID
　　Local Parent ID
　　MAESI Bit
　　Mirror Bit
　　Mirror Target ID
　　Multicast IPV6 Address
　　Multicast mirror group
　　Frequency of Mirror
　　Time StampS
　　Etc.

OPERATIONS: — 202b

Create ( );
　　Delete ( );
　　Move ( );
　　Change owner ( );
　　Change group ( );
　　Link ( );
　　Unlink ( );
　　Change permissions ( );

File Class

204a — ATTRIBUTES:

Type
   Actions Enabled
   Permissions
   Owner
   Group ID
   Local ID
   Local Parent ID
   MAESI Bit
   Mirror Bit
   Mirror Target ID
   Multicast IPV6 Address
   Multicast Mirror Group
   Frequency of Mirror
   Time Stamps
   Etc.

204b — OPERATIONS:

Open ( );
   Edit ( );
   Append ( );
   Read ( );
   Write ( );
   Link ( );
   Concatenate ( ) or Open, Read, redirect, close ( );
   Create ( );
   Delete ( );
   Move ( );
   Change owner ( );
   Change group ( );
   Link ( );
   Unlink ( );
   Change permissions ( );

FIG. 2C

| DIR.A | $F_{A1}$ | $F_{A2}$ | $F_{A3}$ | DIR.B | $F_{B1}$ | $F_{B2}$ | DIR.C | $F_{C1}$ | $F_{C2}$ | $F_{C3}$ | $F_{C4}$ | DIR.D | $F_{D1}$ | $F_{D2}$ |
|---|---|---|---|---|---|---|---|---|---|---|---|---|---|---|
| Vol. Z | DIR.A | | | DIR.A | DIR.B | | DIR.A | DIR.C | | | | DIR.C | DIR.D | |
| Pointer A | N/A | | | Pointer B | N/A | | Pointer C | N/A | | | | Pointer D | N/A | |

(IPID) 300A — top row
(CI) 300B — bottom

FILE SYSTEM TRANSLATORS AND METHODS FOR IMPLEMENTING THE SAME

CROSS REFERENCE TO RELATED APPLICATIONS

This application is related to U.S. patent application Ser. No. 09/708,246, filed on Nov. 7, 2000, and entitled "Dynamic Flat File Systems and Methods for Generating the Same."

BACKGROUND OF THE INVENTION

1. Field of the Invention

This invention relates generally to computer systems, and more particularly to file systems and file system translators that enable efficient communication between computers, computers and storage nodes, and between nodes having operating systems and file systems of different types.

2. Description of the Related Art

Computer systems, as is well known, are defined by hardware and software. At a minimum, the hardware will include some I/O devices, storage (e.g., a hard drive) and a processor (e.g., a CPU) with associated memory. An essential software component is an operating system (OS). The operating system is designed to manage the hardware, software and the logical resources to ensure a desired level of system performance. Other common OS functions include: (1) scheduling, loading, initiating, and supervising the execution of programs; (2) allocating storage and memory; (3) initiating and controlling input/output operations; and (4) handling errors. To date, numerous file systems for operating systems such as Windows, NT, DOS, MacOS, Linux, Unix, OS/2, RISC OS, have been designed. However, many of them are unique to their particular platform OS and are thus incompatible with each other.

Depending on the platform, the operating system may have several OS and platform specific components, one of which is the file system. Primarily, the function of file systems is the overall management of those files and data that are accessed to and from storage by the computer system. For example, the file systems manage the storing, referencing, sharing, and securing of files; the accessing data stored as files; and maintenance of file integrity. Simply put, file systems dictate the way files are named and where they are placed logically for storage and retrieval. Conventionally, operating systems implement hierarchical file systems (i.e., hierarchical tree structure). That is, the files are stored, named, and referenced hierarchically in directories and subdirectories of a file system, thus creating a hierarchical list of parent-child relationships, which is used to identify the files thus facilitating the performing of operations on the files.

By nature, different files and directories of a hierarchical file system may have the same name so long as those having identical names are stored in different directories. However, despite their predominant commercial use, several shortcomings can be associated with the hierarchical file systems. One of such deficiencies is that in hierarchical file systems, files and directories can only be identified in the context of a hierarchy (multi-level parent-child relationship). That is, while the parents know the identities of their children, the children are completely ignorant of the identities of their parents. As such, performing any operation on any of the files requires traversing and/or manipulation of the tree structure. Thus, to perform an exemplary operation of moving a file from one directory to another directory, first, the file must be located through a thorough traversing of the tree structure followed by an actual remapping of the file from the original directory to the targeted directory. For instance, in some cases, it may be required that the file be actually moved from one location to another on the same physical storage device. The locating of the file through traversing of the file system tree as well as the physical relocation of the file are problematic as they are, inefficient, time consuming, and in some cases, require a computer savvy user or a complex software to handle the complexities of such actions.

Additionally, file systems vary as different operating systems implement distinct file systems. For example, some common file systems and their corresponding operating systems are DOS, File Allocation Table (FAT), NTFS of Windows, and HPFS of OS/2, etc. Typically, operating systems implement different file systems as a result of technical dissimilarities such as differences in file system mounting semantics, naming conventions, naming limitations, file system information presentation, etc. This utilization of diverse operating systems and file systems is particularly problematic because file systems implement different file formats, thereby making it almost impossible for different file systems to directly share the file data of other file systems. This limitation is magnified in a network environment. For instance, take the example of a remote client having a Unix-based operating system requesting access to a file stored on a server computer running the Windows operating system. Unfortunately, the server will not be able to carry out the client's request, as the formats of the Unix-based file system and the Windows-based file system are distinct, thus making it impossible for each of the two file systems to fulfill the requests of the other.

So far, this limitation has been resolved through utilization of file system converters and translators. That is, utilizing conversion and translation software, the client file system specifics are masked so that the file system of the client machine is able to understand the format of the file of a different file system. In the same manner, the client computer can be configured to convert or translate file system commands generated by a server that utilizes a different file system. In either situation, each of the client computer and the server computer will need to have the appropriate converter or translator locally installed. Thus, to accommodate all possible scenarios, a different converter or translator must be used for communication between pairs of existing file systems. Furthermore, using different converters and translators requires that the user, the process, or the other software have the capability to understand that there is a need to convert or translate between file systems, identify the correct software conversion/translation tool, properly load the product, and establish the proper interfacing protocols. Not only is set up complicated for the average computer user, but such conversion or translation is, by design, limited to conversion or translation from one file system to another file system. If communication with still other different platforms is desired, then additional conversion or translation tools will have to be obtained and loaded on each of the systems desiring cross-platform communication. In some cases, the loading of more than one conversion or translation tool can cause the wrong conversion or translation tool to be invoked, thus preventing the desired conversion or translation. This may happen if the user is required to choose between various conversion/translation tools or even if the system automatically selects the conversion/translation tool.

As can be appreciated, if files are to be shared with among multiple computer operating systems and platforms, users will not easily be able to access files without having a complex software or previous knowledge as to the type of file systems on each platform. For this reason, it is very difficult to share files and data over communication links since each storage device, such as a hard drive, is controlled by the OS and the local file system.

In view of the foregoing, there is a need for a file system that can efficiently grant access to heterogeneous platforms running different operating systems and associated file systems. There is also a need for file systems that enable efficient accessing, grouping, and moving of files without having to physically move data (e.g., relocate). Additionally, there is a need for a file system translator that facilitates communication between systems having multiple differing operating systems running their own native file systems to data.

SUMMARY OF THE INVENTION

Broadly speaking, the present invention fills the aforementioned needs by providing a file system translator capable of enabling efficient and transparent communication between nodes having heterogeneous operating systems and associated file systems. In one embodiment, the file system translator of the present invention facilitates the simultaneous transparent access of heterogeneous platforms running different operating systems and associated file systems to a file system of a provider node, such as a storage node or a file server. The file system translator preferably includes a translator layer, which translates the commands communicated in the format of a file system native to the consumer to the file system format of an input/output node.

It should be appreciated that the present invention can be implemented in numerous ways, including as a process, an apparatus, a system, a device, a method, or a computer readable media. Several embodiments of the present invention are described below.

In one embodiment, a translation system for translating between nodes having heterogeneous file systems is disclosed. The translation system includes a consumer node having a first file system and a driver for supplementing requests from the first file system to a storage device. Also included in the translation system is an input/output (I/O) node which implements a second file system. The I/O node is connected to the storage device and is in communication with the consumer node over a transport. The I/O node includes a translator layer designed to map the supplemented requests from the first file system to the second file system and back to the first file system.

In another embodiment, a method for enabling communication between nodes having heterogeneous file systems is disclosed. The method includes generating a request to communicate with a desired I/O node that is connected through a nexus. Thereafter, discovery of the desired I/O node is performed followed by enumerating the desired I/O node and the devices connected to the desired I/O node. Subsequently, a read request is communicated to a particular device of the enumerated devices associated with the desired I/O node, which is intercepted and supplemented before communication over the nexus.

In yet another embodiment, a method for enabling communication between nodes having heterogeneous file systems is disclosed. The method starts with an I/O node receiving a request for communication from a consumer node, which is then followed by the I/O node determining a file system type of the consumer node. A second file system is mounted at the I/O node. Subsequently, the metadata of the second file system is reformatted at the I/O node so as to substantially match a metadata format of the first file system. The reformatted metadata is then sent to the consumer node so as to be mounted by the consumer node, thereby enabling file level I/O between the consumer node and the I/O node, as the reformatted metadata enables transparent translation to and from the first file system and the second file system.

In yet another embodiment, a method for enabling communication between nodes having heterogeneous file systems is disclosed. The method includes a consumer node generating a request to communicate with a desired I/O node that is connected to a nexus so as to perform discovery and enumeration of the desired I/O node. The I/O request for communication over the nexus is then supplemented. Thereafter, the I/O requests to a particular device of the enumerated devices associated with the desired I/O node is communicated over the nexus. An I/O node then receives the I/O request from the consumer node and then determines file system type of the consumer node to be a first file system. Thereafter, a second file system is mounted at the I/O node and the metadata for the second file system is then loaded. Subsequently, the metadata of the second file system is reformatted at the I/O node so as to substantially match a metadata format of the first file system. The reformatted metadata is then loaded by the consumer node, thereby completing the mount and enabling communication between the consumer node and the I/O node, as the reformatted metadata enables transparent translation to and from the first file system and the second file system.

The advantages of the file system translator of the present invention are numerous. Most notably, the file system translator of the present invention enables multiple consumer platforms running different operating systems and native file systems to concurrently access and share the same file data or directory data. Specifically, this simultaneous access of multiple consumers occurs regardless of the type of the operating system and file system executing on the consumer platforms and without any of the consumers having knowledge of the fact that in actuality, each of the consumers has accessed data running on a dissimilar operating system or file system. Still another benefit of the file system translator of the present invention is that the initial communication of the consumer reveals and establishes the type of the consumer file system for all the future I/O communications during a session.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIG. 2B provides a table of a directory class encapsulating attributes of directory type objects and operations that may be performed upon directory type objects, in accordance with another embodiment of the present invention.

FIG. 2C provides a table of a file class encapsulating attributes of file type objects and operations that may be performed upon file type objects, in accordance with one embodiment of the present invention.

FIG. 3B provides a block diagram showing a maintaining of information concerning the parent-child relationship between directory type objects and file type objects of a dynamic flat file system, in accordance with another embodiment of the present invention.

DETAILED DESCRIPTION OF THE EXEMPLARY EMBODIMENTS

Figure 1:
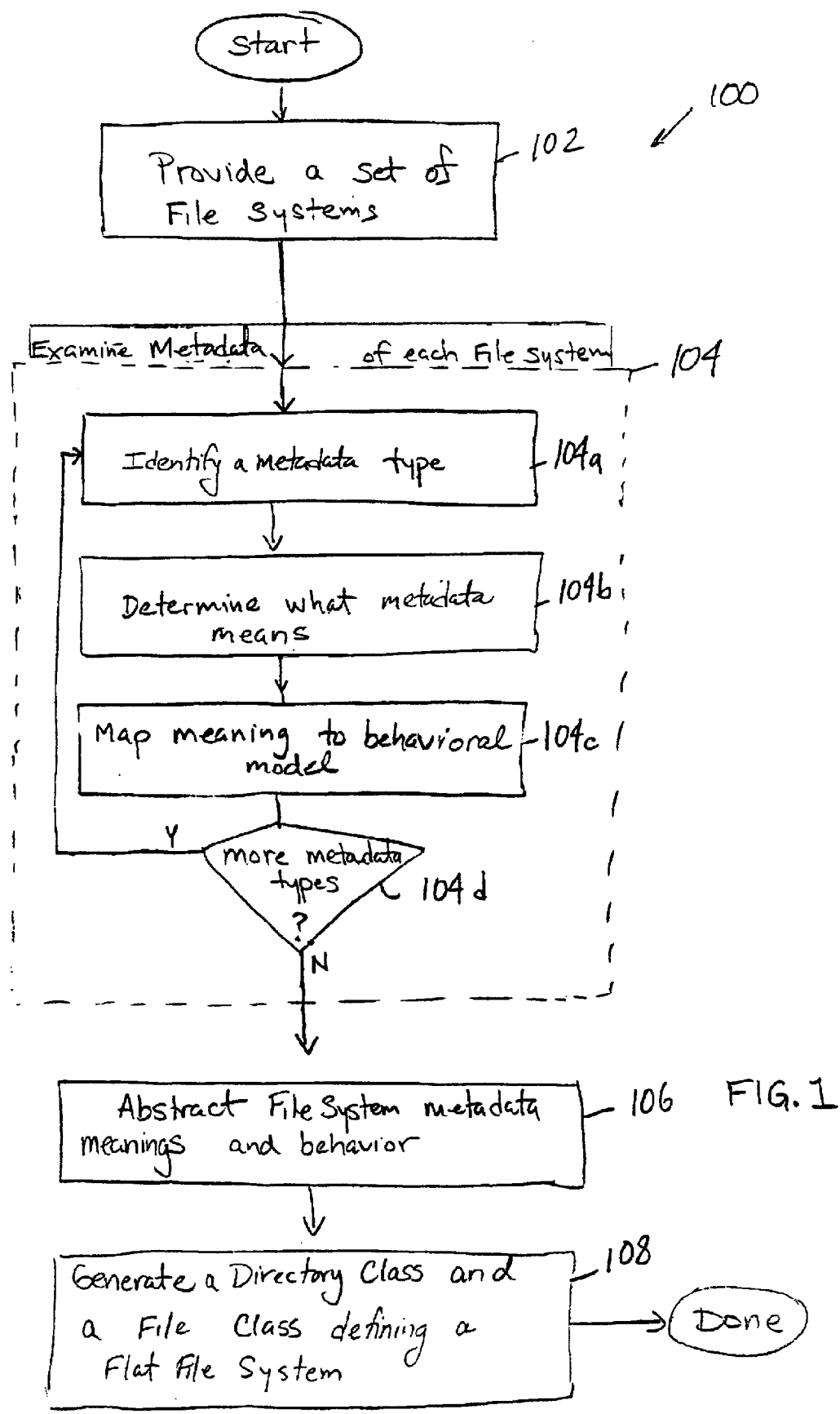
FIG. 1 is a flow chart illustrating a method of creating a dynamic flat file system, in accordance with one embodiment of the present invention.

Inventions for a file system translator capable of enabling efficient and transparent communication between nodes having heterogeneous operating systems and/or associated file systems are disclosed. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

As an overview, the present invention enables this transparent communication by providing consumer computer systems capable of generating file I/O requests with a driver that supplements requests made to an I/O node so as to enable operations on data managed by the I/O node. The I/O node will preferably include a translator layer that detects the requests for access to data, and in response, performs transparent mapping of those requests to and from a file system of the I/O node. In a preferred embodiment, the file system of the I/O node is a dynamic flat file system. The dynamic flat file system is used for accessing file data and communicating with heterogeneous systems running their own native file systems. In exemplary embodiments, the dynamic flat file system is a flat file system herein defined as a file system that is in the form of a flat array of objects. The objects of the object-based dynamic flat file system are configured to be one of a "volume" class, a "directory" class or a "file" class. All objects include an entry for their immediate parent object, which may be a node object, a volume object or a directory object, respectively. In preferred embodiments, sets of attributes associated with the file class or directory class of the dynamic flat file system are configured to include substantially all of the attributes associated with existing file systems. As new file systems are introduced, additional attributes can be added to the classes, and thus the objects. As such, the set of attributes associated with the dynamic flat file system of the present invention is configured to substantially be a superset of all the attributes associated with substantially all known existing file systems.

In one exemplary implementation, a dynamic file system is created by abstracting metadata of files, directories and volumes of a file system through attributes of objects. "Metadata," as used herein is defined as data about files, directories, volumes, etc., which is used by file systems to manage and access files and directories after a file system type of device is mounted. For example, such data may include the location of the data element, the association of the data element, the ownership, information about the context of the data element, quality and condition of the data, characteristic of the data, etc. Exemplary attributes of file and directory type objects of the dynamic flat file system are: type, actions enabled, permissions, owner, group ID, local ID, local parent ID, etc. Thus, unlike the conventional file systems, both the directory and file type objects of the dynamic flat file system have knowledge of the identity of their immediate parents. In addition, directory type objects can also provide a list of their immediate children and their respective attributes.

By mapping and converting the metadata of the file systems to attributes of volume, file and directory type objects, the dynamic flat file system can mimic any flat file system or any hierarchical file system. That is, using the child information and parent information, a "false tree" can be constructed. Consequently, the relocation of a file from one directory into another directory does not require the actual physical relocation of the file or manipulation of a path descriptor. The object-based nature of the dynamic flat file system efficiently achieves this objective by simply changing the attributes of the file type and directory type objects. Additionally, unlike the conventional file systems, the object-based dynamic flat file system enables users and programs to directly access the directory and file type objects without traversing a hierarchical structure.

The file system translator of the present invention is configured to enable heterogeneous systems running different operating systems and associated file systems to concurrently access and transparently use the data of the file/directory type objects of a file system of an input/output ("I/O") node. In preferred embodiments, the file system translator of the present invention is a translator layer implemented in an I/O node and has the capability to determine the type of the consumer platform file system and to present the dynamic flat file system of the I/O node in the format of the consumer platform file system. Preferably, in one implementation, the consumer platform file system type is supplied to the translator via an independent storage driver resident in the consumer platform. In an exemplary embodiment, presenting the I/O node file system in the format of the consumer platform file system format is achieved by the dynamic flat file system loading the metadata of the dynamic flat file system and subsequently reformatting the metadata such that the dynamic flat file system metadatasuperblock matches the format of the consumer platform file system. The reformatted metadata is thereafter shipped to the consumer platform thus enabling the consumer platform to perform a mount operation.

Accordingly, the file system translator of the present invention has the capability to concurrently provide file data and directory data to a plurality of consumers running different operating systems and native file systems. In preferred embodiments, this is achieved without the file system translator converting file content data or directory content data. That is, in one implementation, the file system translator treats the data within file type objects as bit streams, thus not requiring the conversion of the data itself.

For ease of understanding, a detailed description of the dynamic flat file system will be provided in Section I, and a detailed description of the file system translator will be provided in Section II.

I. Dynamic Flat File System

FIG. 1 is a flow chart 100 illustrating an exemplary method of creating a dynamic flat file system, in accordance with one embodiment of the present invention. The method begins at an operation 102 wherein a set of file systems is provided. Exemplary file systems are those associated with operating systems such as, Unix™, Sun Microsystems Inc. Solaris™, Microsoft Corp. Windows™, Apple Computer Inc. Mac OS™, etc. These file systems include, for example, FAT16, FAT32, NTFS, HPFS, UFS, EFS, Berkeley FS, AT&T Unix FS, LFS, AFS, Unicos FS, etc. The method then moves to an operation 104 where metadata of each of the provided file systems is examined. This examination begins by operation 104a wherein a first metadata type is identified. Then, the method moves to operation 104b where a determination is made as to what the particular metadata being examined means in the context of a specific file system. That is, a determination is made as to what information the metadata intends to convey and why the metadata conveys such an information. Next, in operation 104c, the method maps meaning to behavioral model.

For example, in a Unix-type file system, files and directories have attributes such as creator, owner, group, executability, and type. These attributes can be modified by performing a chmod operation. However, some of these attributes do not have any meaning within Windows and NT file systems. For example, the concept of group permissions does not apply in Windows and NT file systems. Instead, in Windows and NT file systems, the group permissions is performed by "sharing" tools. Another example would be the attribute "executable" in the Unix file system as this attribute does not have any meaning in DOS, Windows or NT file systems. Instead, DOS, Windows or NT file systems use file name extensions such as ".exe" to convey the information that a file is an executable file. However, an ".exe" extension as used in Unix file system, does not convey the information that a file is executable. Thus, in operation 104c, the method decides as to how the information conveyed by the metadata means what it intends to mean. This is important in assessing the behavioral semantics driven by metadata interpretation and actions.

Following operation 104c, the method moves to operation 104d where it is decided whether there is more metadata to examine. As long as metadata exists whose type has not yet been determined, the method returns to operation 104a. However, once all the metadata types have been determined, the method moves onto operation 106 where the meanings and behavior of the file system metadata are abstracted. This operation is then followed by operation 106 where a dynamic flat file system is created through the generation of at least a directory class and a file class. That is, in operation 106, files, directories, and hard disk volumes are abstracted by objects. Thereafter, in operation 108, the dynamic flat file system is created by mapping of file metadata to file class and directory class attributes.

Figure 2A:
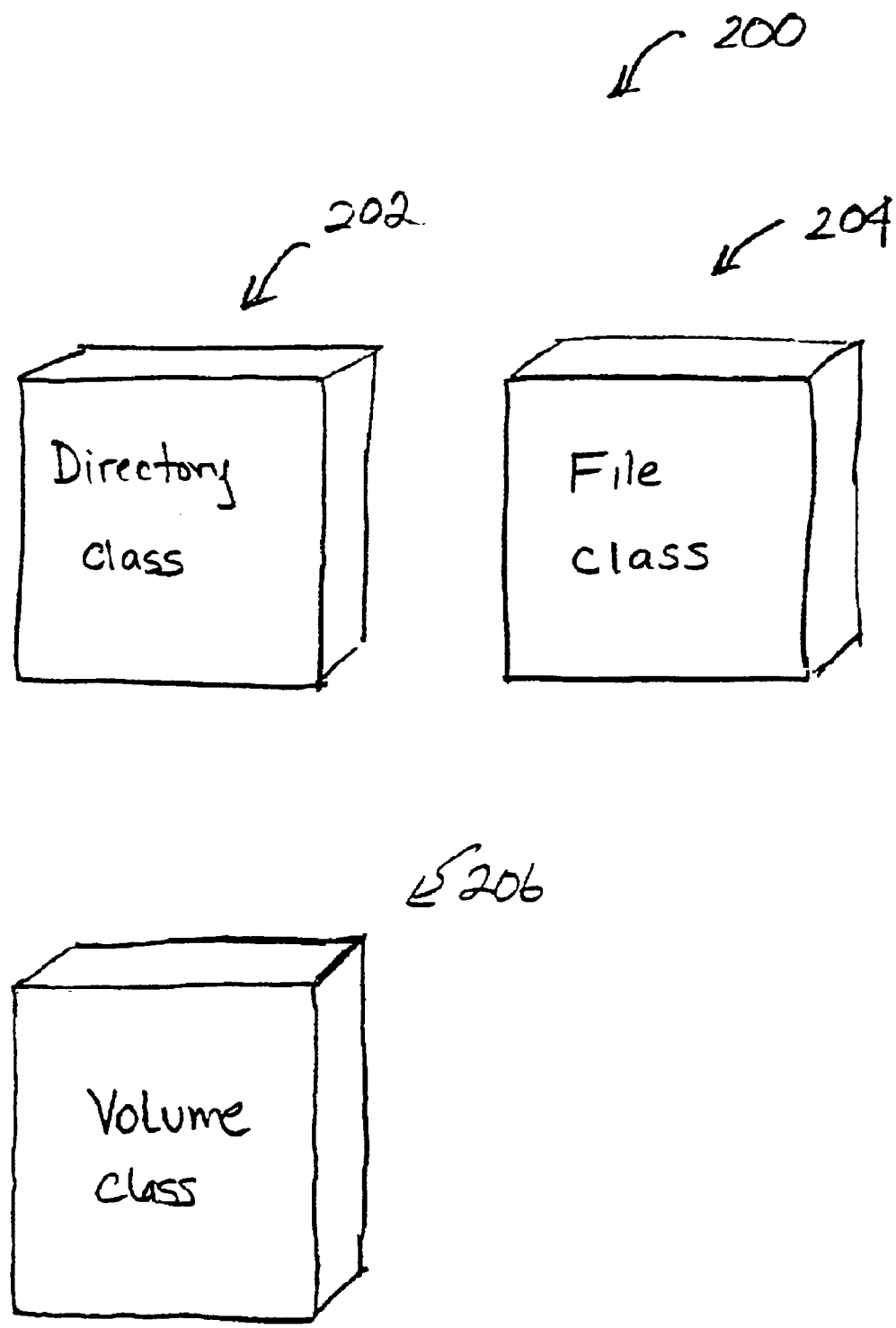
FIG. 2A depicts an exemplary directory class, an exemplary file class, and an exemplary volume class of a dynamic flat file system, in accordance with one embodiment of the present invention.

FIG. 2A depicts a directory class 202, a file class 204, and a volume class 206 of an object-based dynamic flat file system, in accordance with one embodiment of the present invention. Classes, acting as templates, instruct a compiler or other tools to construct objects, which are instances of objects of a class. Thus, as classes, directory class 202, file class 204, and volume class 206 specify attributes and operations of directory type objects, file type objects, and volume type objects of dynamic flat file system.

As shown in FIG. 2B, a directory class 202 has encapsulated attributes 202a and operations 202b, which are then represented as directory type objects when instances are created. In a like manner, FIG. 2C depicts attributes 204a and operation 204b encapsulated within a file class 204. Attributes 202a and 204a respectively describe directory type objects and file type objects. Similarly, the operations 202b and 204b, respectively, define how directory objects and file objects interact with respect to other directory objects and file objects. For example, different directory type objects are separate instances of the directory class and as such, may have different attribute values, while different directory-type objects may be subjected to the same operations. Thus, an attribute is a changeable property or characteristic of directory type objects, file type objects, and volume type objects and can be set to different values, while the operations may stay the same. The operations 202b are programmed procedures of a class and as such, are defined in the directory type objects. In one embodiment, to ensure data integrity of directory type objects, the operations of a directory type object can only have access to the data known to that directory type object. Furthermore, an operation of a directory type object can be re-used in multiple directory type objects.

As shown in FIGS. 2B and 2C, the attributes 202a of the directory class 202 and the attributes 204a of the file class 204 include: type, actions enabled, permissions, owner, group ID, Local ID, Local parent ID, MAESI bits, mirror bit, mirror target ID, multicast IPv6 address, multicast mirror group, frequency of mirror, time stamps, and etc. The following is a brief description of exemplary attributes.

A type attribute reveals a type of an object and in one exemplary embodiment, it may consist of three (3) bits. In another embodiment, the type attribute may have any of the following values: file, directory, IPC special, special 2, special 3, special 4, special 5, and Reserved. Special files as used herein are defined as files that are interpreted in a unique manner and may not contain data or information about other files. Exemplary special files may be Unix "pipes" or device files or RAID representations of aggregated disk volumes (i.e., logical volumes). As such, similar to data files, special files may be stored on real rotating media or disk drives. Thus, special files may be file system structures, redundant array of inexpensive disks (RAID) 5 parity, RAID metadata, scratch, or any other type of implementation-defined file so long as file rule compliance is achieved.

The actions enabled attribute identifies specific operations, which may be performed on the object. For instance, if the object is a directory type object, the operations create, delete, move, change owner, change group, link, unlink, and change permissions may be performed on the object. However, if the object is a file type object, a separate set of operations, such as, open, edit, append, read, write, link, create, delete, move, change owner, change group, concatenate, link, unlink, and change permissions may be performed on the object.

The permissions attribute reveals the operations that may be performed by each user, group or user/kernel process. In one embodiment, this attribute is modeled after Unix $n_0 n_1 n_2$ values for files and directories. However, any other type of permissions attribute can be used so long as permissions can be enforced.

The owner attribute reveals the identity of the owner of an object. In one embodiment, the owner attribute can occupy 64 bytes. The 64 bytes can be allocated as follows: upper most bits are identified as Globally Unique Identifier (GUID). In one embodiment, the GUID is distributed as follows: 64 bits are allocated to IPv6 addr, 64 bits are allocated to unique identifier, and up to 48 bytes of ASCII string. In a different embodiment, NULLs are added to the end of the ASCII string to make up for the remainder of empty bytes.

The group ID attribute reveals the identity of the group an object belongs to and in one embodiment consists of 128 bits. The local ID/name and local parent ID/name are the identities of the object and the immediate parent of the object, respectively. In one embodiment, each of the local ID/name and local parent ID/name may consist of 256 bits.

MAESI bits are used to ensure file consistency among instances of a file, which may be shared, and in one embodiment, MAESI consists of 5 bits. The "M" (i.e., modify), "A" (i.e., attribute), "E" (i.e., exclusive), "S" (i.e., share) and "I" (i.e., invalid) bits define different modes and different actions which may be performed or may need to be performed to maintain consistency between files or data. The MAESI bits also enable the operation of several actions, which will now be described in greater detail below.

List Action

Among the actions that may be performed on the copies of the file is a "List" action. When a user or process desires to list (e.g. using ls or lf or a comparable function) properties of a file (i.e., file size, access permissions, owner, etc.), a change is not made to a file. Thus, the "M", "A", "E", "S" and "I" bits remain unchanged. This is because the attributes of a file may be read without performing an open of the file itself.

Open Shared Action

Another action a user or process may perform on the file is an "Open Shared" to place the file in an open shared mode. This is especially common practice if a file is to only be read. In the open shared mode, a user or process opens a file, and other users or processes are able to simultaneously open copies of the file. In this instance, the "S" bit is (which represents the shared mode) set on the file accessed by the user or process and all other copies of that file. No changes to other copies of this file are required. When the user or process closes the file, the "S" bit in the file and the multiple copies is reset. Although, if other instances were open in the open shared mode, the "S" bit will remain set until all instances having the "S" bit set are closed.

Open Exclusive Action

When a user or process desires to execute an "Open Exclusive" action to set an open exclusive mode, the "E" bit is set on all copies including the one desiring to set the open exclusive mode. Initially, a determination is made to ascertain whether any one of the "M", "A", "E", "S" and "I" bits is set on another instance of the file. That is, if any instance has one of the consistency bits set to "1" (i.e., true), then the user or process desiring to set the open exclusive mode will fail. However, if no other instances have one or more of their consistency bits set to "1", then the user or process will be able to open the file in the open exclusive mode. When the "E" bit is set, all instances of the file will fail an "open," except for the one that set the "E" bit. Furthermore, any attempts to open the file by other consumers (e.g., a user or process on a computing device) will also fail, which includes preventing all others from making independent copies of the file. The only operation that may be performed on a file that has its "E" bit set to "1" is a LIST of that file. The list operation allows only file attributes to be read. It must be noted, however, that the information obtained from the list operation may later be invalid, as it is possible to exclusively open a file and for the user or application performing the exclusive open to alter the attributes of the file thus making one or more of its attributes invalid (e.g. to render an executable file non-executable). Upon the close of the file the having its "E" bit set, that "E" bit shall be reset to zero "0." In addition, the initiating file will also have its "M" bit set to 1 (if it was written) and all copies/instances of that file will have their "I" bit set to "1" and shall be updated to match that of the copy which had its "E" bit set. When all updates have occurred, the "M" and all relevant "I" bits are reset to "0." During an open, if the attributes are changed, the protocol will call for the "A" and "I" bits to be set for all other instances, as will be described in greater detail below.

Write Action

When a user or process desires to write to a file or perform another modification on the file that is opened shared or opened exclusive, the user or process may execute a "write" action. The "M" bit is used when data in the file is modified in any manner. Thus, as data is written to the file, the "I" bit in copies of the file is set to indicate that the data contained in the copies is now invalid. This occurs since the data contained in the copies does not include the modifications made to the initiating file. Thus, all other copies must be updated to match the file with the "M" bit set. Once this has occurred, the "M" and "I" bits in all affected files must be set back to false (e.g., zero), indicating that consistency has been attained. In one embodiment, the data in the copies is updated by the application, file system, or operating system acting upon the copies "pulling" the modification from the modified file. In another embodiment, the copies are updated by "pushing" the modification(s) to any affected copies having the "I" bits. In still another embodiment, the pulling and pushing operations can be performed using a messaging technique in order to reduce communication overhead.

Change Attributes Action

A user or process may also change the attributes of a file with a "Change Attributes" action. Exemplary attributes can include name, owner information, access permissions, location of the file, the size of the file, time stamps, as well as other writable attribute parameters. As the user or process changes the attributes of the file, the "A" bit and the "M" bit is sent on the initiating file, and the "A" bit and the "I" bit is set on all other instances. This ensures that all other instances are made aware that the attributes are now invalid. As soon as other files are updated with the attribute changes, the "A" and "M" bits are reset on the initiating file, and the "A" and "I" bits are reset on all updated instances of the file. At that time, all other instances and the initiating file will have consistent attributes. In one embodiment, the instance copies are updated when the copies "pull" the attribute changes from the initiating file. In another embodiment, the instance copies are updated when the initiating file "pushes" the attribute changes to the instance copies.

Close Action

A "Close" action, which closes the file opened by the user or process, is also shown with respect to the table 218. When a user or process completes one of the aforementioned actions, the file in use can then be closed. In some cases, the "close" action may have an implicit "write" performed (or not). The close action is completed when all the bits that were set (e.g., the "S" bit in the open shared mode) are reset. For more information on the consistency protocols described herein, reference can be made to co-pending and commonly assigned U.S. Patent Application entitled "FILE CONSISTENCY PROTOCOLS AND METHODS FOR CARRYING OUT THE SAME," having U.S. application Ser. No. 09/662,368, filed on Sep. 13, 2000. This application is herein incorporated by reference.

Mirror bit indicates whether a particular file, directory or volume has been selected for N-Way mirroring protection. N-Way mirroring of data resident on storage devices ensures the protection of an initiator drive or data resident at the initiator drive. In exemplary embodiments, one or more drives are selected to be mirroring devices which will maintain updates of changes made to data resident at the storage associated with an initiator drive (e.g., the drive or drives having the data to be protected). The mirroring devices can, in a preferred embodiment, be resident at any location. The locations are preferably selected so as to protect the data at the storage of the initiator from harm, such as fire, earthquakes, floods, theft and the like. Therefore, the mirrored drives can provide more than simple fault tolerance, but also can provide protection from unrecoverable physical events. The data to be mirrored, is preferably kept consistent using the MAESI consistency protocol to ensure that all instances of files or data are updated. In one embodiment, the mirror bit may be only one bit having a value of either "0" or "1", which will indicate whether or not a particular file, director, or volume is to be protected using N-Way mirroring. For more information on N-Way mirroring, reference can be made to co-pending and commonly assigned U.S. Patent Application entitled "N-Way Data Mirroring Systems and Methods for Using the Same," having U.S. application Ser. No. 09/684807, filed on Oct. 6, 2000. This application is herein incorporated by reference.

Mirror target ID may represent the ID of the entities that represent a mirror group. In one embodiment, the mirror target ID can be represented as nexus GUID or other similar ID. Multicast IPv6 might be used to define the targets comprising a mirror group. In a like manner, the multicast mirror group will define the group or groups that defined for an N-Way mirroring arrangement. For more information on nexus GUID and independent storage architecture, reference can be made to co-pending and commonly assigned U.S. Patent Application entitled "Independent Storage Architecture," having U.S. application Ser. No. 09/704193, filed on Oct. 31, 2000. This application is herein incorporated by reference.

The frequency of mirror attribute reveals the time interval within which the N-Way mirroring updates take place. In one exemplary embodiment, the frequency of mirroring attribute can be defined by 4 bits. In such an embodiment, the frequency of mirroring attribute can, for example, have any of the following values: immediate, every 30 minutes, every hour, every 4 hours, every 8 hours, every 16 hours, every 24 hours, every 48 hours, every 72 hours, every week, every month, every quarter, semi-annually, annually, never, reserved, etc.

A separate time stamp attribute is associated with the create, last open or read, last write, and delete operations performed on each file/directory type object. In another embodiment, each of the time stamps may consist of 8 bytes that may, for example, represent a monotonically increasing counter value.

With a continued reference to FIG. 2B, the following operations may be performed on directory type objects: create, delete, move, change owner, change group, link, unlink, change permissions, and list. A summary of each of the directory type operations is as follows:

Create—this operation creates a new directory type object;

Delete—the operation deletes a directory type object;

Move—this operation moves a directory type object from one directory type object to another directory type object;

Change owner—changes the owner of the directory type object;

Change group—this operation changes the active group of the directory type object;

Link—creates a new link between the directory type object and a file that is located in a different directory;

Unlink—deletes a link between the directory type object and a file;

Change permissions—changes the access to a directory type object for a type of user; and List—provides a list of all the directory/file type objects in a directory type object. For instance, in one embodiment, this function may be used to display a number of file attributes or metadata (e.g., all the contents of a directory type object and its subdirectories, size, date information, permission, etc.).

Referring to FIG. 2C, the following operations may be performed on file type objects: open, edit, append, read, write, link, concatenate or open, read, redirect, close, create, delete, move, change owner, change group, link, unlink, change permissions. The following is a summary of the operations that may be performed on the objects of the dynamic flat file system:

Open—opens a file type object;

Edit—makes changes to a file type object;

Append—this operation attaches specified data to the contents of a file type object;

Read—reads a file object type;

Write—writes to a file type object;

Concatenate—pushes a file type object content to a specified output. In one embodiment, the sequence "open, read, redirect, close" is used to emulate the concatenate function, which changes the time stamps of the last opened date and the last accessed date, whereas the concatenate operation may not alter the time stamps;

Create—creates a file type object;

Delete—deletes a file type object;

Move—moves a file type object;

Change owner—changes the ownership of a file type object;

Change group—changes the active group of a file type object;

Link—creates a link between a file type object and a specified file/directory type object;

Unlink—deletes a link between a file type object and a specified file/directory type object; and Change permissions—changes the type of access to a file type object for a type of user or group.

As shown, the attributes and operations associated with the directory and file type objects of the dynamic file system are designed to be a superset of substantially all of the attributes and operations or alternatively, substantially all the metadata of most all of the known file systems. However, it must be appreciated by one of ordinary skill in the art that the attributes and operations associated with the file/directory type objects of the dynamic flat file system of the present invention can be continually updated to include emerging attributes and operations of existing file systems or new file systems.

Figure 3A:
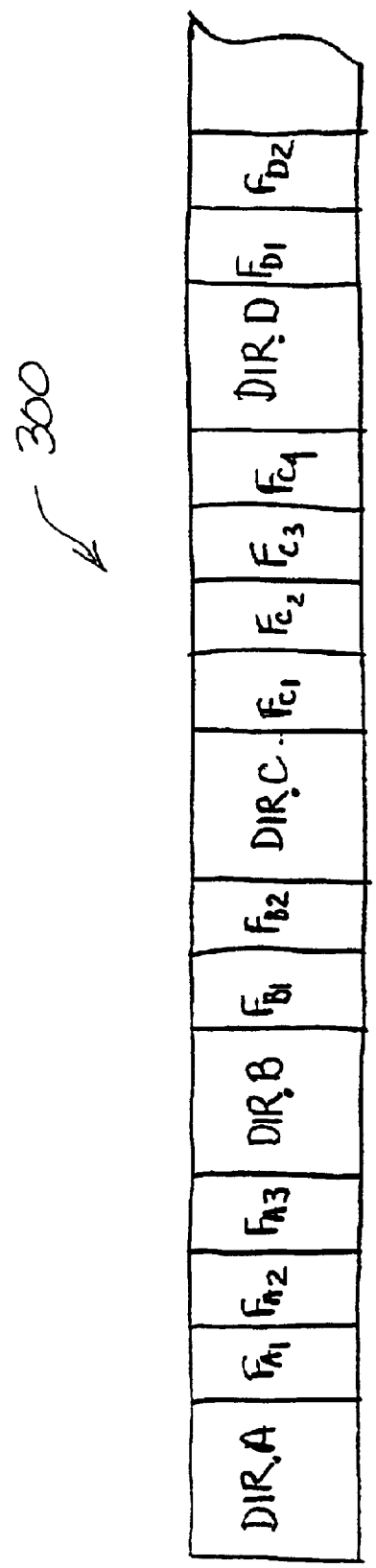
FIG. 3A illustrates a plurality of exemplary directory and file type objects of a dynamic flat file system, in accordance with yet another embodiment of the present invention.

FIG. 3A is an illustration of a dynamic flat file system 300 having a plurality of directory type objects and file type objects, in accordance with one embodiment of the present invention. As shown, the dynamic flat file system 300 is in the form of a flat array of directory type and file type objects. That is, a plurality of directory type objects (e.g., Dir.A, Dir.B, Dir.C, Dir.D, etc.) and a plurality of file type objects (e.g., $F_{A1}$, $F_{A2}$, $F_{A3}$, $F_{B1}$, $F_{B2}$, $F_{C1}$, $F_{C2}$, $F_{C3}$, $F_{C4}$, $F_{D1}$, $F_{D2}$, etc.) are arranged as a one-dimensional array. Thus, unlike the conventional hierarchical file systems, the dynamic flat file system of the present invention maintains the parent-child relationship between the directory and file type objects through the use of attributes. Additional details regarding the structure of the dynamic flat file system and its maintenance of parent-child relationship are described below in connection with FIGS. 3B–5.

As to the organization of the dynamic flat file system 300 of FIG. 3A, in one embodiment, a structure of the dynamic flat file system is stored as a special file (i.e., file system metadata). In one embodiment, the dynamic flat file system metadata is stored in a first logical cylinder of a disk volume. In another embodiment, a duplicate of the dynamic flat file system metadata is stored in the 0X100 binary (i.e., 256 in decimal scale) logical cylinder. Substantially the entire of both of the logical cylinders is reserved for the storage of the dynamic flat file system metadata. The structure of the dynamic flat file system stored as a special file contains the contents of substantially the entire portion of the dynamic flat file system that is in use. As such, the structure does not represent existing free space. However, the volume of free storage space can be calculated and its hexadecimal value can be stored on a logical disk volume. The benefits of not representing free storage space in the dynamic flat file system metadata of the present invention are twofold. One is that the size of the dynamic flat file system metadata is substantially minimized. Second, it is not necessary to recreate the entire structure of the dynamic flat file system in order to increase the amount of its free storage space, as this task can simply be achieved by changing the calculation of the volume of the free storage.

As to the file/directory type objects, in one embodiment, for each of the file/directory type objects, the dynamic flat file system metadata contains an entry describing attributes of the file/directory type object. In another embodiment, only highly substantially significant attributes are included (e.g., owner, group, permissions, file location by logical block number, size, MAESI current bits, etc.).

Additionally, each of the file type objects of the present invention has metadata associated therewith. In one embodiment, the file type object metadata is stored as a special file defined herein as a metadatasuperblock (MDSB) in two locations on each of the physical disk volumes. In the situation wherein the logical volumes of the file system span multiple physical disks, the metadatasuperblock is stored across the physical disk volumes with the disk-specific information being located on each physical disk or a subset of each physical disk.

In one exemplary implementation, a set of pointers is associated with the metadatasuperblock. In one example, these pointers are used by the directory type objects to point to a list, which contains a metadata subset for each of the children of each of the directory type objects. In another embodiment, the metadata subset for each of the children substantially includes the following attributes: name, date stamps, size, permissions, MAESI state bits, etc. In one exemplary embodiment, each of the lists is configured to be an arbitrary length special file which size, in bytes, may be calculated by multiplying the number of objects that it represents by the size of the MDSB entry, in bytes.

The maintaining of the parent-child relationship between directory type objects and file type objects of a dynamic flat file system is depicted in FIG. 3B. As shown, in the dynamic flat file system of the present invention, directory type objects can reference other directories and files associated with those directories. Also shown is that directory type objects contain hidden information with respect to each of their children and whether each of the children is a directory type object or a file type object. In addition, directory type objects also have information with respect to their immediate parent, which depending on the situation, may be a piece of computer hardware (e.g., disk volume, RAID volume, etc.) or another directory. In a like manner, file type objects maintain information concerning their immediate parent.

As shown, a chart 350 of FIG. 3B reveals that the information concerning immediate parents and children of the file/directory type objects are hidden within the directory/file type objects. As shown, a row 300A of the chart 350 contains the information regarding the Immediate Parent ID (IPID) of the directory/file type objects while the row 300B contains the data regarding the Children Information (CI) of the directory/file type objects. For instance, in one exemplary embodiment, Dir.A has an IPID Vol. Z meaning that the immediate parent of the directory type object Dir.A is a disk volume Z. Also shown are file directory objects $F_{A1}$, $F_{A2}$, $F_{A3}$, and $F_{A4}$ having the directory type object Dir.A as an immediate parent. Further shown are directory type objects Dir.B and Dir.C both having the directory type object Dir.A as an immediate parent. Similarly, the directory type object Dir.D is shown to have the directory type object Dir.C as its immediate parent. Specifically shown is that all of the file type objects have a directory type object as an immediate parent. For example, the directory type object Dir.B is the immediate parent of file type objects $F_{B1}$ and $F_{B2}$, the directory type object Dir.C is the immediate parent of file directory objects $F_{C1}$, $F_{C2}$, $F_{C3}$, and $F_{C4}$, and the directory type object Dir.D is the immediate parent of file type objects $F_{D1}$ and $F_{D2}$. In one embodiment, the IPID of directory type objects are GUIDs of the immediate parents as set forth previously with respect to the owner attribute of file/directory type objects.

As shown in the CI row 300B, the information a directory type object Dir.A has about its children is a pointer A of a metadatasuperblock pointing to a list (not shown) which contains the metadata subset of all of the children of the directory type object Dir.A. In a similar manner, metadata subsets of children of directory type objects Dir.B, Dir.C, and Dir.D can be located through pointer B, pointer C, and pointer D, respectively. Each of the pointers pointer A, pointer B, pointer C, and pointer D point to a separate list of metadata subset of all of the children of directory type objects Dir.A, Dir.B, Dir.C, and Dir.D, respectively.

Thus, as shown, directory type objects are configured to have an immediate parent, which could be either another directory type object or a piece of hardware. Similarly, file type objects are also configured to have an immediate parent, which substantially always is a directory type object. On the other hand, a directory type object is configured to have a pointer to a list containing the metadata subset of all of the children of that particular directory type object, while file type objects substantially never have any children. Further information with respect to locating the children of directory type objects is set forth below with respect to FIG. 4.

Figure 4:
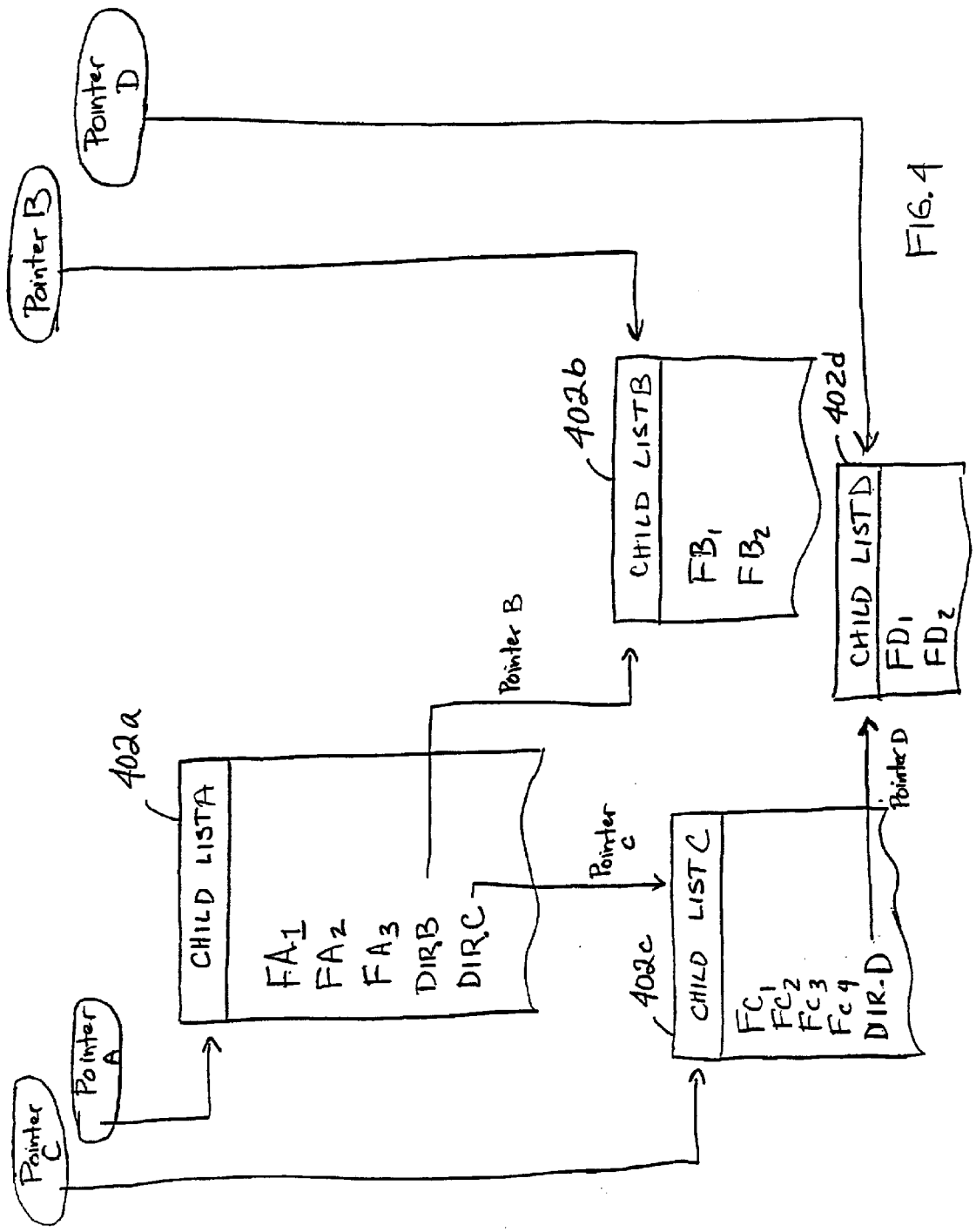
FIG. 4 depicts pointers associated with directory type objects of a dynamic flat file system of FIG. 3B pointing to their respective children lists, in accordance with still another embodiment of the present invention.

FIG. 4 depicts a pointer A used by the directory type object Dir.A, a pointer B used by the directory type object Dir.B, a pointer C used by the directory type object Dir.C, and a pointer D used by the directory type object Dir.D of FIG. 3B pointing to each of their respective children lists: child list A, child list B, child list C, and child list D, in accordance with one embodiment of the present invention. As shown, in response to an initial request, the pointer A used by the directory type object Dir.A points to a child list A 402*a* which contains file type objects $F_{A1}$, $F_{A2}$, and $F_{A3}$, and directory type objects Dir.B and Dir.C. It must be noted that when the contents of the child list A are revealed to the user or process, system or node, the object types of the children are unknown to the directory type object Dir.A. This is caused because the directory type object Dir.A has the capability to read and reveal the contents of the child list A but, in one embodiment, cannot parse through the child list A to determine the types of each of the objects present in the Child list A.

As shown, two of the children of the directory type object Dir.A, directory type objects Dir.B and Dir.C are directories themselves. As such, by inputting a different command input specifier, the user or process, system or node may request that a recursive listing of the children of all the directory type objects be performed. For instance, a command input specifier requesting the recursive listing of the directory type object Dir.A will result in a list containing all the children of the directory type objects Dir.A, Dir.B, Dir.C, and Dir.D. That is, once it has been determined that the directory type object Dir.B is one of the children of the directory type object Dir.A, the pointer used by the directory type object Dir.B is recursively invoked, thus revealing the contents of the child list B 402*b*. Similarly, once it has been determined that the directory type object Dir.C is one of the children of the directory type object Dir.A, the pointer C used by the directory type object Dir.C is invoked recursively, thus revealing the contents of a child list C.

As shown, the children of the directory type object Dir.C are file type objects $F_{C1}$, $F_{C2}$, $F_{C3}$, and $F_{C4}$ and the directory type object Dir.D. Again, since the directory type object Dir.C has a directory type object Dir.D as a child, the pointer D used by the directory type object Dir.D is invoked recursively, thereby revealing the contents of the Child list D 402*d*. Since directory type objects Dir.B and Dir.D only contain file type objects $F_{B1}$, $F_{B2}$, $F_{D1}$, and $F_{D2}$, respectively, no further recursive listing occurs. As shown, in a different embodiment, the children of directory type objects Dir.C, Dir.B, and Dir.D may also be accessed independently through the use of the pointer C, pointer B, and pointer D.

Figure 5:
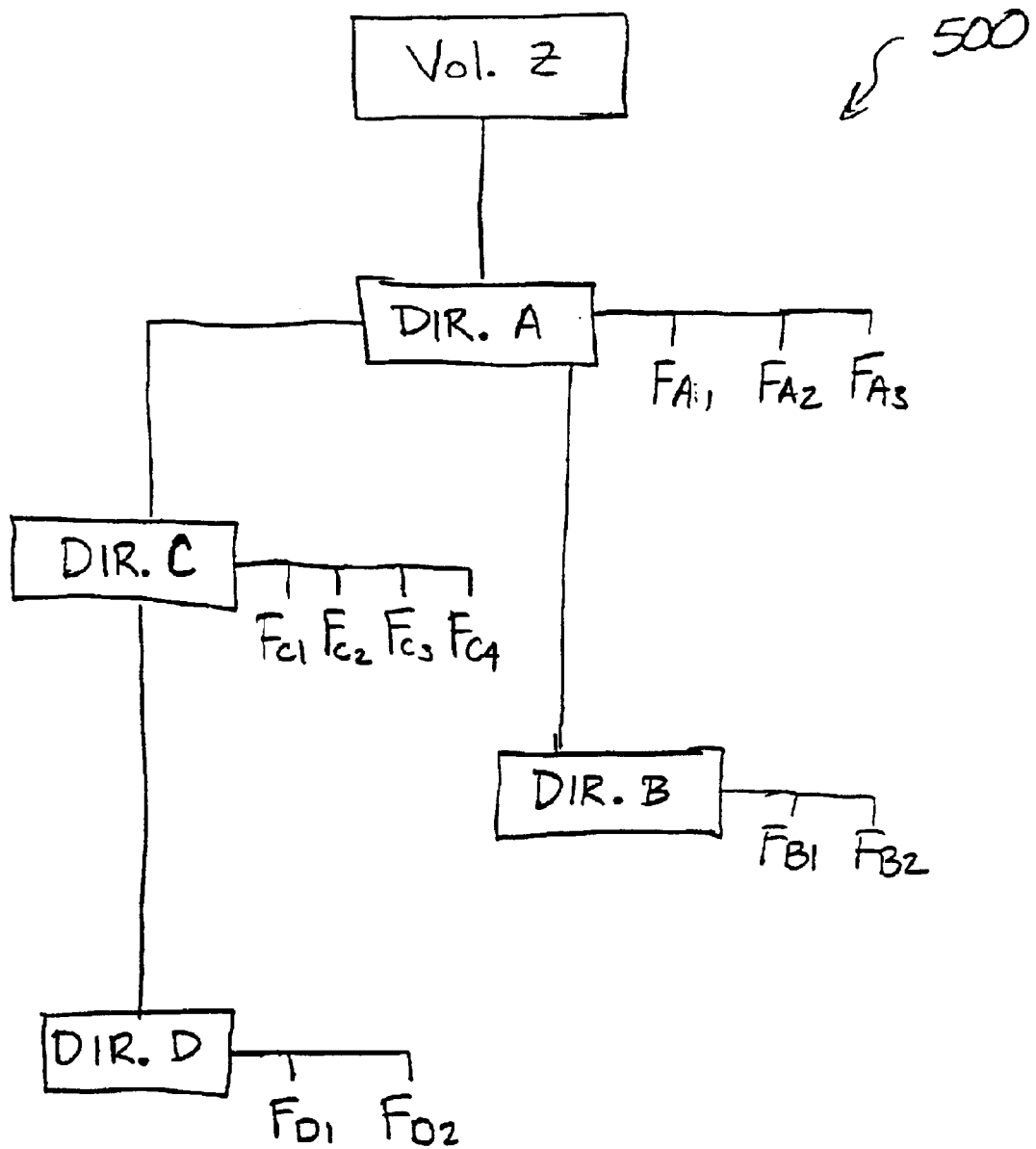
FIG. 5 depicts the dynamic flat file system of FIG. 3A presented as a hierarchical tree structure, in accordance with yet another embodiment of the present invention.

FIG. 5 illustrates the capability of a dynamic flat file system of the FIGS. 3A and 3B to mimic a hierarchical structure file system, in accordance with one embodiment of the present invention. As shown, a nested tree structure is constructed utilizing the information provided in FIG. 3B. Thus, in one embodiment, utilizing the parent-child relationship between the directory type object Dir.A and Vol. Z, and the directory type object Dir.A and file type objects $F_{A1}$, $F_{A2}$, and $F_{A3}$, a first level of a nested tree 500 can be constructed. Subsequently, utilizing the parent-child relationship between the directory type objects Dir.B and Dir.C with the directory type object Dir.A, a second level of the tree structure can be defined. FIG. 3B also reveals parent-child relationship between the directory type object Dir.C and file type objects $F_{C1}$, $F_{C2}$, $F_{C3}$ and $F_{C4}$ as well as the directory type object Dir.B and file type objects $F_{B1}$ and $F_{B2}$. Finally, utilizing the parent-child relationship between the directory type objects Dir.D and directory type object Dir.C as well as the directory type object Dir.D and file type objects $F_{D1}$ and $F_{D2}$, a third level of nested tree structure can be defined.

The capability of the dynamic flat file system to mimic hierarchical file systems is unique to the dynamic flat file system of the present invention and cannot be replicated by the hierarchical file systems. That is, unlike the prevalent existing hierarchical file systems wherein children are required to be specified in relationship to their grandparents, parents, and so on, the parent-child and sibling relationship between directory type objects and file type objects of the present invention do not require the parents and children to be specified with respect to one another in the dynamic flat file system. By nature, the dynamic flat file system of the present invention does not imply or require that a file type object or a directory type object be located adjacent to its parent or to its children. Nor does the dynamic flat file system of the present invention require an actual physical relocation of a file or an object. In fact, a modification of the parent-child relationship between objects of the dynamic flat file system can simply be achieved by changing the values of the attributes of the objects, thus creating a very efficient dynamic flat file system.

II. File System Translator

Figure 6:
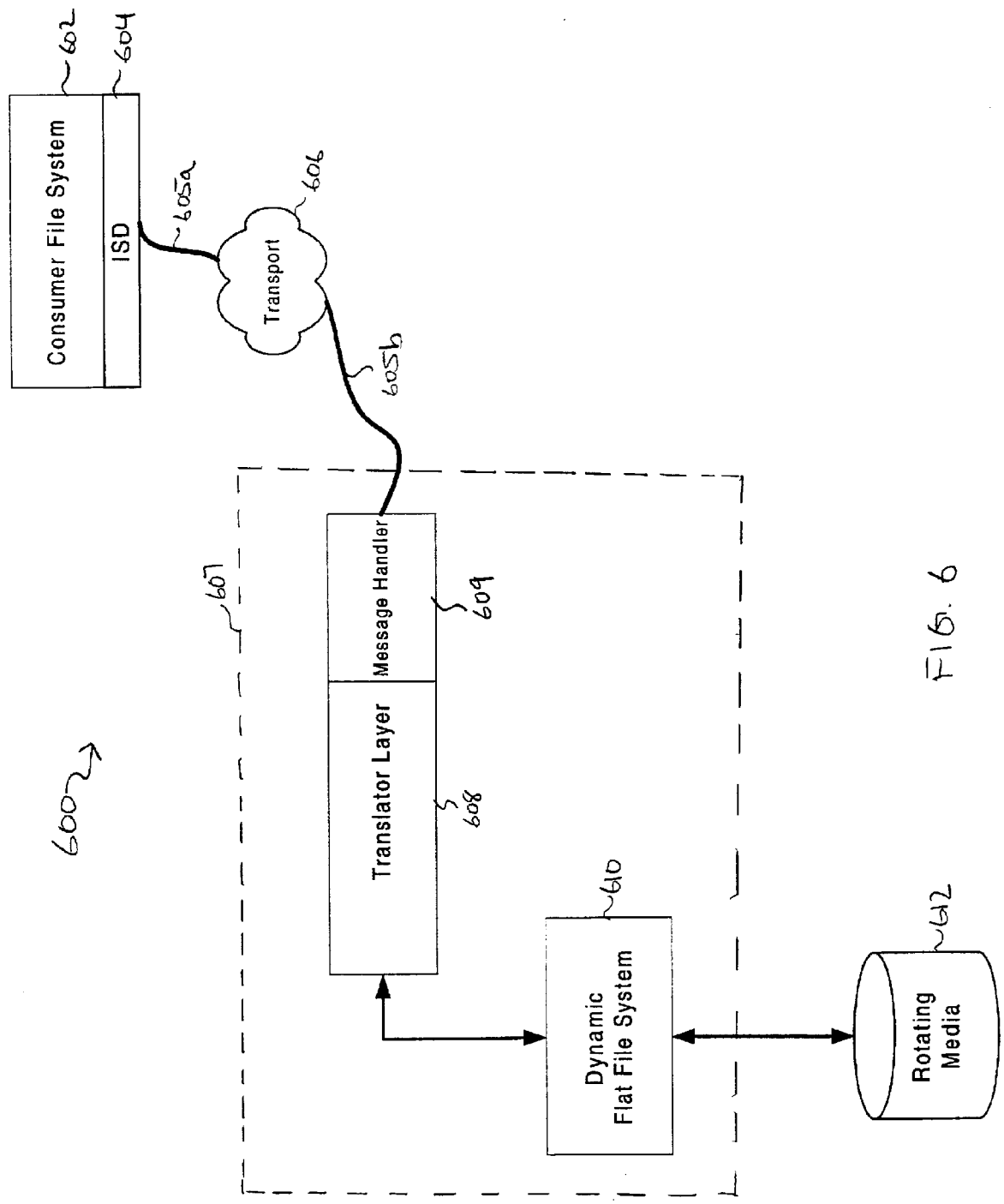
FIG. 6 is a schematic diagram of a communication system illustrating the communication of an I/O node with a consumer node, each running heterogeneous file systems, in accordance with another embodiment of the present invention.

With the dynamic flat file system description in mind, FIG. 6 is a schematic diagram of a communication system 600 illustrating the communication of an I/O node with a consumer node, each having heterogeneous file systems, via a transport, in accordance with one embodiment of the present invention. As shown, the communication system 600 includes a consumer file system 602 coupled to a transport 606 via a transport connection 605*a*. Also included in the communication system 600 is an I/O node 607 coupled to the transport 606 via a transport connection 605*b*. The consumer file system 602 interfaces with an independent storage driver (ISD) 604 configured to receive and manipulate (i.e., interpret) the request issued by the consumer file system 602. For instance, in one implementation, the ISD 604 is configured to supplement the request issued by the consumer file system 602 such that the supplemented request carries and reveals the type of the consumer file system 602. It must be noted that although in one implementation the ISD 604 is configured to be a kernel-privileged software module executing on the consumer node, in a different embodiment, the ISD 604 may be a loadable file system, a device driver and protocol stack, a monolithic disk and transport abstraction, etc.

In addition to supplementing the request, the ISD 604 is configured to interface with the message handler 609, which is optionally included within the I/O node 607. That is, the ISD 604 is configured to transmit the supplemented request to the message handler 609 via the transport connection 605*b*. In one exemplary embodiment, the transport connection 605*b* may be a nexus. In one implementation, the message handler 609 is configured to discriminate between different types of supplemented requests. For example, depending on whether the supplemented request is a management type request or an input/output request, the message handler 609 is configured to filter the transmitted supplemented request and then route the same to its proper destination. That is, if the transmitted supplemented request is a management type request, the message handler 609 is configured to route the management type request to an appropriate logic component local to the I/O node (not shown in this drawing). However, if the supplemented request is an input/output type request, the message handler 609 is designed to forward the input/output request to a translator layer 608 also included within the I/O node 607. Thus, the translator layer 608 is configured to reformat the transmitted supplemented input/output message into a format of a dynamic flat file system 610. It should be noted that the dynamic flat file system 610 discussed herein as one example, and other file systems can also be made to work with the file system translator of the present invention.

Once it has been determined that an input/output request has been transmitted, the supplemented request is then shipped to the translator layer 608 in which the type of the consumer file system 602 is determined. The translator layer 608 is capable of analyzing and determining the type of the consumer file system 602 as the supplemented request carries and conveys such information. At that point, in one embodiment, the translator layer 608 maps the supplemented request to its substantially equivalent dynamic flat file system command. For example, a "read" request in the consumer file system type is mapped to a "read" request in the dynamic flat file system type. This reformatting of the supplemented request can be achieved irrespective of the consumer file system type, as in one embodiment, the dynamic flat file system 610 is configured to be a superset of substantially all known existing file systems. Updates to the superset can therefore be made at anytime.

Subsequently, the translator layer 608 provides the supplemented reformatted request to the dynamic flat file system 610, which is also included within the I/O node. The request formatted in the dynamic flat file system format (i.e., read, mount, etc.) is then passed to a rotating media 612 coupled to the dynamic flat file system 610. For instance, in a "mount" request, the metadatasuperblock of the dynamic flat file system is read from its established location on the rotating media 612. Thereafter, the metadatasuperblock is provided to the translator layer 608 in which the metadatasuperblock is reformatted such that it substantially matches the consumer file system type. The reformatted metadatasuperblock is then provided to the consumer file system as a part of the mount operation of file system 602. This is advantageous as regardless of the consumer file system type, the translator layer 608 has the capability to map the consumer file system request to a dynamic flat file system request and reformat the dynamic flat file system metadatasuperblock into a format that substantially matches the consumer file system format.

It must be noted that the rotating media 612 is configured to be any data storage device that can be used to store data (e.g., a hard disk drive, multiple drives, RAID arrays, or any other type of media that can store data either locally or remotely). Furthermore, the transport may be a network, a bus, a wireless mechanism or any other physical medium that can establish communication between nodes. The message handler code can be written in any computer language, so long as it is capable of discriminating and routing different type of transmitted computer requests.

Figure 7:
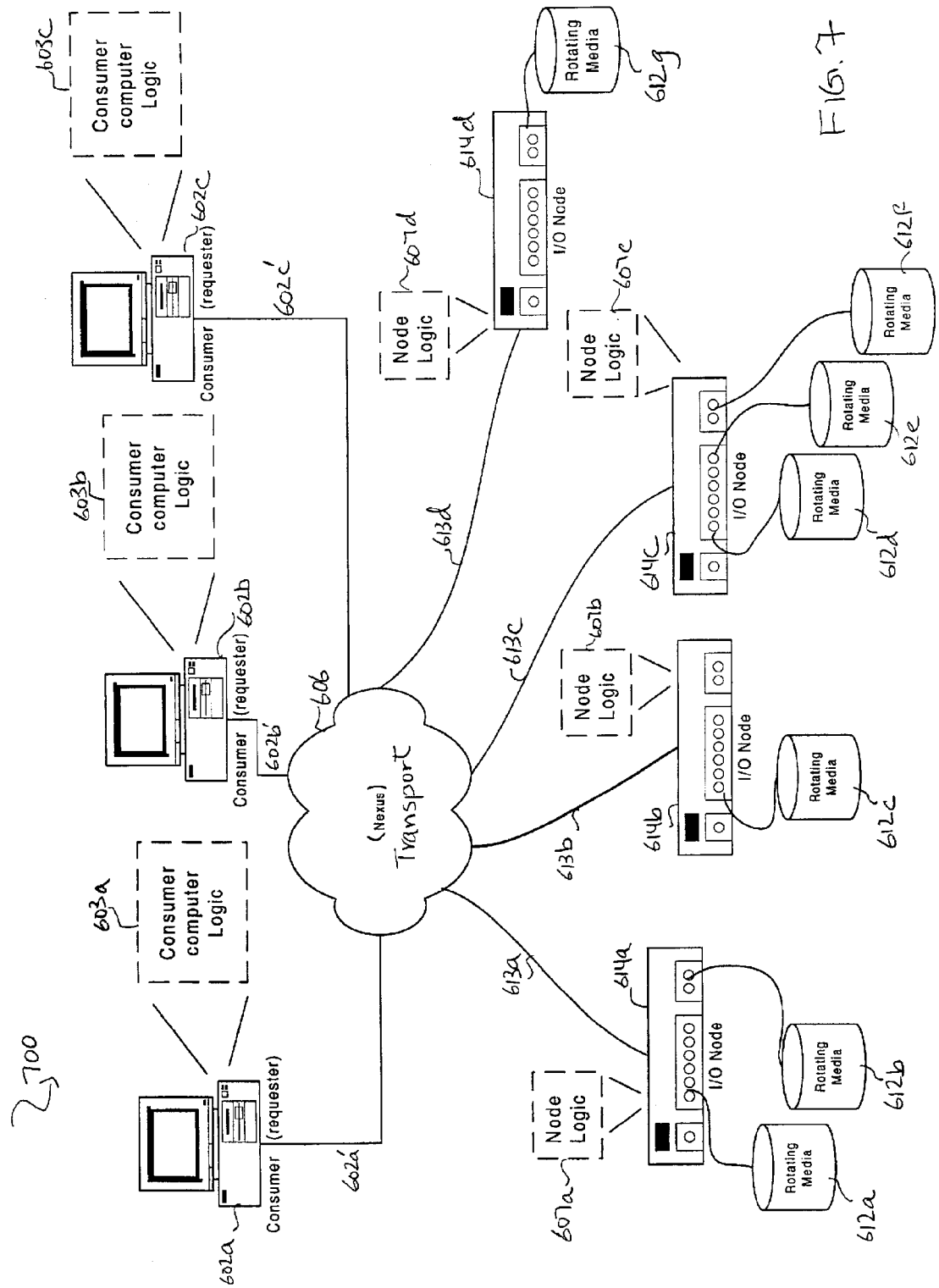
FIG. 7 is a high level diagram of an independent storage system including a plurality of consumers having heterogeneous file systems in communication with a plurality of I/O nodes via a transport, in accordance with still another embodiment of the present invention.

FIG. 7 is a high level diagram of an independent storage system 700 including a plurality of consumer nodes having heterogeneous file systems in communication with a plurality of I/O nodes via a transport, in accordance with one embodiment of the present invention. As shown, the independent storage system 700 includes consumer nodes (i.e., requesters) 602a, 602b, and 602c, each of which is coupled to a transport 606 via an associated transport connection 602a', 602b', and 602c'. Typically, the consumer nodes 602a through 602c can be personal computers, servers, personal digital assistants "PDA," or any other computing device having a processor, memory, and transport hardware for communicating over a transport. For example, in one implementation, personal computers are coupled to the transport via a transport hardware, which a user or process uses to store and retrieve needed data. As shown, each of the consumer nodes 602a, 602b, and 602c has an associated consumer computer logic 603a, 603b, and 603c. In one exemplary embodiment, each of the consumer computer logics 603a, 603b, and 603c is configured to include an application layer, a file system layer, and an independent storage driver. Additional details with respect to the components of the consumer computer logic are described below in connection with FIG. 8.

Also included in the independent storage system 700 are a plurality of I/O nodes 614a, 614b, 614c, and 614d, each of which is coupled to the transport 606 via transport connections 613a, 613b, 613c, and 613d, respectively. As shown, in one exemplary embodiment, each of I/O nodes 614a–614d can be connected to one or more rotating media 612a–612g. Thus, the configuration of FIG. 7 enables each of the consumer computer logic 603a–603c to interact with any of the I/O nodes 614a–614d of the independent storage system 700 as if the I/O nodes 614a–614d were local to the consumer nodes 602a–602c. Also shown in FIG. 7 are a plurality of node logic 607a–607d associated with each of the plurality of I/O nodes 614a–614d. In one preferred exemplary embodiment, each node logic 607a–607d is configured to include a file system translator, a dynamic flat file system, a driver, and an I/O device. More details regarding the components of the node logic are described below with respect to the FIG. 8.

Accordingly, multiple consumer nodes (i.e., consumers 602a–602c) can access any of the I/O nodes of the independent storage system 700 irrespective of the type of operating system being executed on each of the consumer nodes. That is, consumer nodes 602a–602c can simultaneously access and share the same information stored on any of the I/O nodes 614a–614d, regardless of the fact that each of the consumer nodes 602a–602c is executing a different operating system and a different associated file system. For instance, in one embodiment, information stored in rotating media 612d of the I/O node may be simultaneously shared by the consumer node 602a running Windows NT operating system and the consumer node 602 executing Unix™ operating system without either of the consumer nodes 'knowing' that the I/O node is in fact running a dissimilar file system. File consistency can then implement, in one embodiment, the M", "A", "E", "S" and "I" bits.

It must be appreciated that the I/O nodes 614a–614d can be any type of node capable of receiving storage based commands over the nexus 606 and storing data to the associated rotating medias 612a–612g. Furthermore, as discussed above with respect to FIG. 6, the rotating storage medias 612a–612g can be any type of data storage device that can be used to store data (e.g., a hard disk drive, multiple drives, RAID arrays, or any other type of media that can store data either locally or remotely). Likewise, the transport (nexus) may be a network, a bus, a wireless mechanism or any other physical medium, which is capable of establishing communication.

Figure 8:
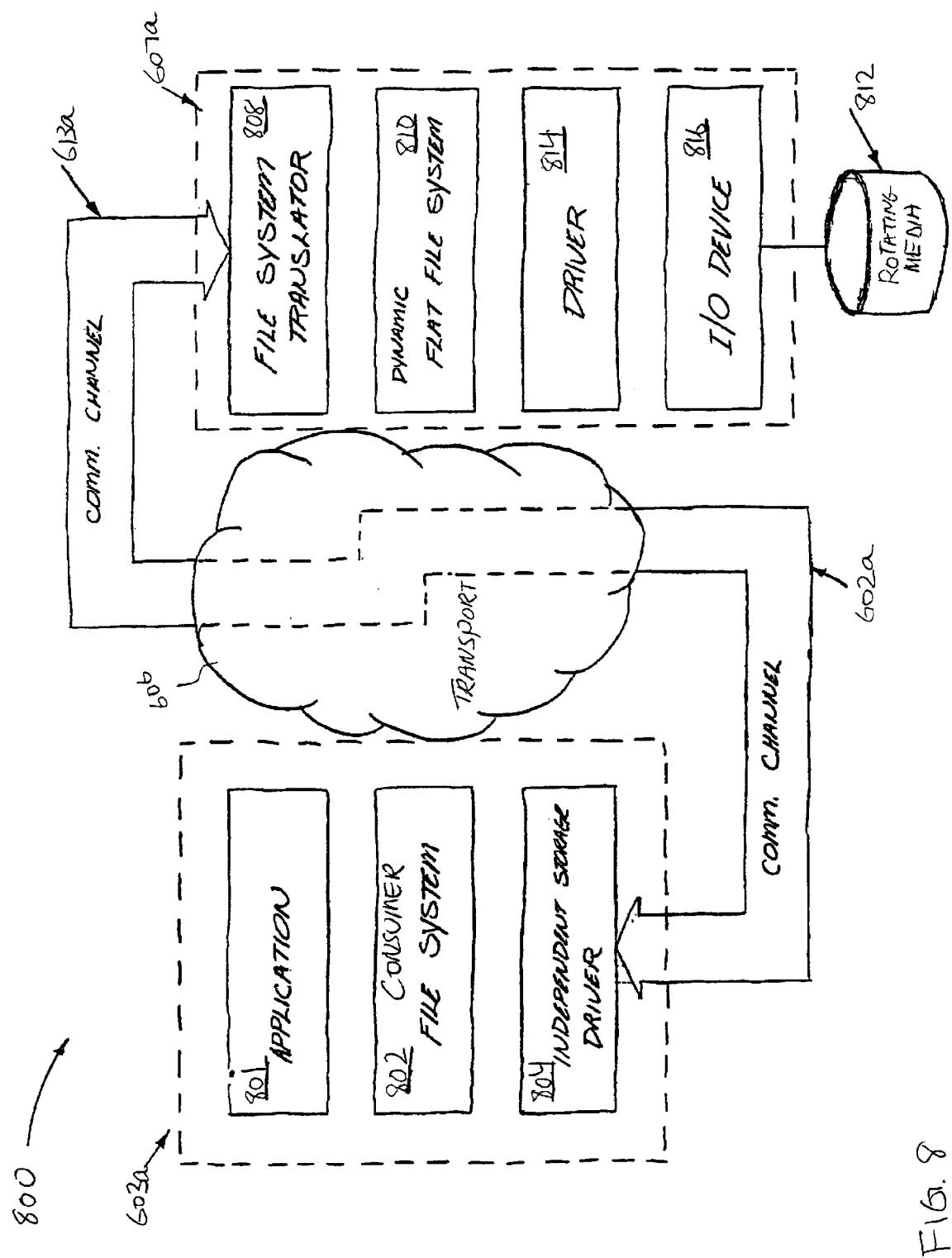
FIG. 8 is a block diagram of a remote independent storage system in communication with a consumer computer, in accordance with still another embodiment of the present invention.

FIG. 8 is a block diagram of a remote independent storage system 800, in accordance with one embodiment of the present invention. The independent storage system 800 includes an exemplary consumer computer logic 603a, which is coupled to an exemplary node logic 607a via respective communication channels 602a and 613a. As will be discussed in greater detail subsequently, the communication channels 602a and 613a instantiate communication between the consumer computer logic 603a and the node logic 607a through a transport 606, which may be a network, a bus, a wireless mechanism or any other physical medium that can establish communication between nodes.

In one exemplary implementation, the consumer computer logic 603a may include an application 801, a consumer file system 802, and an independent storage driver "ISD" 804. As discussed above with regard to FIG. 7, the consumer computer logic 602a can be a personal computer, a server, a PDA or any other computing device having a processor, memory, and transport hardware for communicating over the transport 606.

In a different embodiment, the logic node 607a may include a file system translator 808, a dynamic flat file system 810, a device driver 814, and an I/O device 816 coupled to an exemplary rotating media 812. As discussed above regarding FIG. 7, the logic node 607a can be any type of node capable of receiving file I/O or disk storage based commands over the transport 606 and storing data to the associated rotating media 812. In one implementation, the logic node 607a is a hardware configuration including a processor, memory, and transport hardware capable of transmitting and receiving data via the transport 606. It must be appreciated that the logic node 607a is not generally restricted by hardware. That is, because of the modularity of the independent storage system 800, the I/O node 607a of the embodiments of the present invention can operate in conjunction with many different types of processors, or even a digital signal processor (DSP).

The remote independent storage system 800 advantageously makes the rotating media 812 to appear local to the consumer computer logic 603a. Specifically, the ISD 804 appears to the consumer file system 802 of the consumer computer logic 603a as a typical device driver. In fact, the function of the ISD 804 is to communicate the request of the consumer file system 802 to the logic node 206 via the communication channels 602a and 613a created substantially for this purpose. Hence, the ISD 804 intercepts requests from consumer file system 802, supplements and manipulates the request, and then transmits the request to the logic node 607a. In this manner, embodiments of the present invention can make the rotating media 812 appear as a local drive to the application 801 and consumer file system 802 of the consumer computer logic 603a.

In use, the application 801 transmits a file system request to the consumer file system 802, which in turn passes the file system request to the ISD 804. Then, the ISD 804 transmits the file system request to the file system translator 808 of the logic node 607a via the communication channels 602a and 613a.The file system translator 808 thereafter configures the consumer file system request into a second format based on the dynamic flat file system being executed on the logic node 607a. For instance, in one embodiment, the file system translator 808 configures the file system request into a dynamic flat file system request and provides the translated file system request to the dynamic flat file system 810, which in turn, presents the request to the device driver 814. In another embodiment, the device driver 814 is configured to convert the translated consumer file system request into a typical block-level I/O request that is subsequently passed from the I/O device 816 to the rotating media 812.

Although the exemplary embodiments discussed herein implement a dynamic flat file system 810 on the logic node 607a, it should be appreciated that many file systems can be used. When using a file system other than the dynamic flat file system 810 discussed herein, the file system translator 808 configures the consumer file system request into a format based on the file system executing on the logic node 607a.

As discussed above with respect to part I of the present invention, the dynamic flat file system 810 shown in FIG. 8 is a file system constructed of volume type, file type and directory type objects, structured as a flat array of objects. In one embodiment, objects are of the class "volume", "directory" or of the class "file." Directory and volume objects reference other directories and files associated with the directories. All objects include an entry for their immediate parent object, which may be a node object, a volume object or a directory object. The dynamic flat file system 810 incorporates a set of object attributes that is an abstracted superset of the attributes of substantially other known, existing file systems. In this manner, the dynamic flat file system 810 is capable of representing files from other file systems which attributes are incorporated within the dynamic flat file system 810. As such, the dynamic flat file system 810 enables translation from other file system formats to the dynamic flat file system 810 format, and vice versa.

In one embodiment, the file system translator 808 translates from a disk-resident file system to a consumer system file system format, and vice versa. To this end, the file system translator 808 combines a parsing and generation function with the ability to create file structures from more abstract attribute list, such as the attribute list of the dynamic flat file system 810. In use, in one exemplary embodiment, the file system translator 808 reads the requests of the consumer file system and maps those commands to those of the dynamic flat file system 810 commands.

By using the file system translator 808 in conjunction with the dynamic flat file system 810, the logic node 607a can perform the file system request shipped by the consumer computer logic 603a via the ISD 804 regardless of the type of OS and file system executing on the consumer computer logic 603a.

Figure 9A:
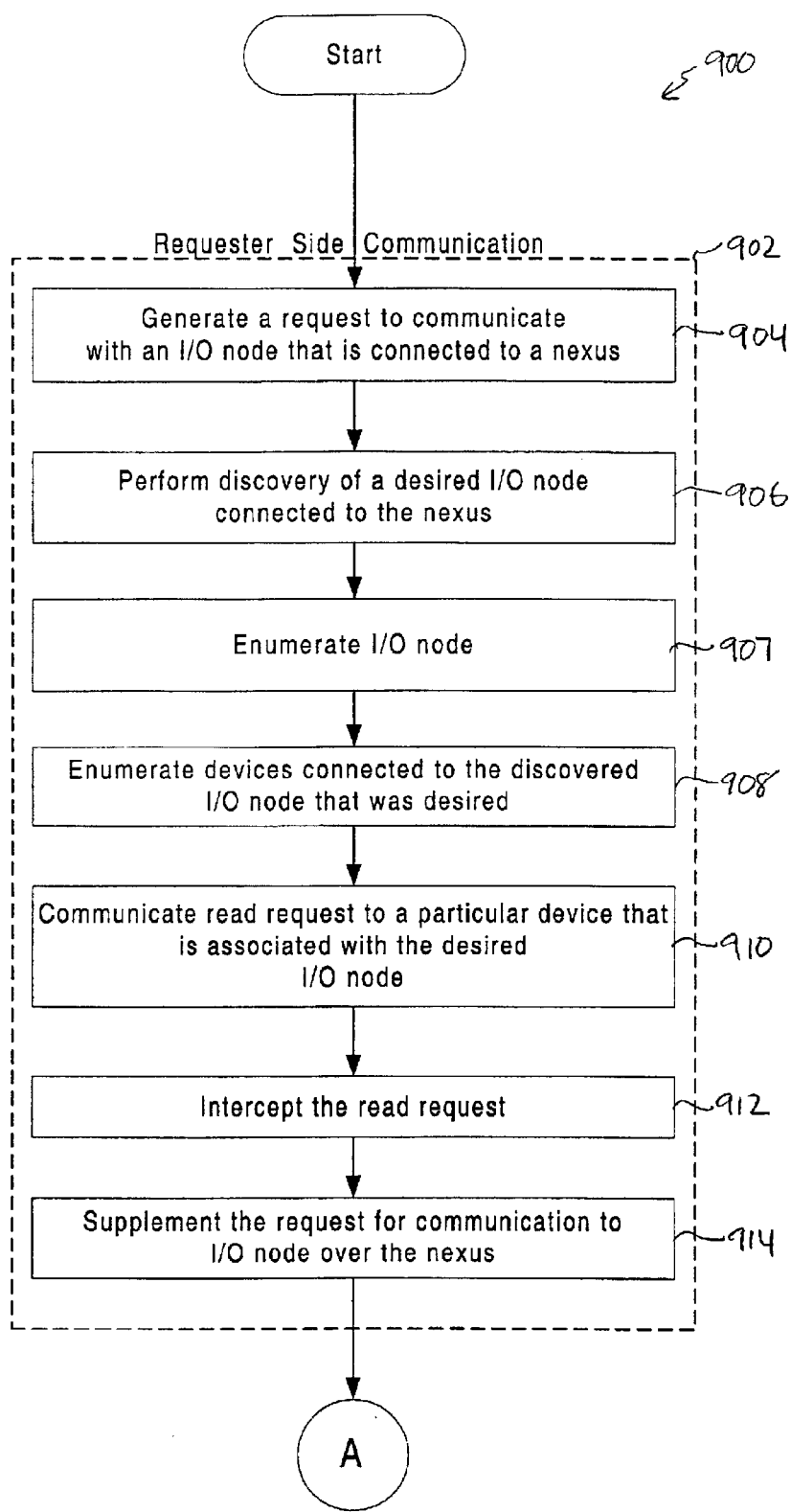
FIG. 9A is a flow chart illustrating an exemplary method of a requester communicating with an I/O node, in accordance with still another embodiment of the present invention.

FIG. 9A is a flow chart 900 illustrating an exemplary method of a requester communicating with an I/O node, in accordance with one embodiment of the present invention. The method begins at an operation 902 where the requester (e.g., a consumer node) communicates with an I/O node. In one embodiment, the requester communication begins at an operation 904 in which a requester generates a request to communicate with an I/O node connected to a nexus. It must be noted that the requester can be a personal computer, a server, a PDA, or any other computing device having at least a processor, memory, and transport hardware for communicating over a transport (e.g., nexus). In preferred embodiments, the request is issued by the file system native to the requester computer. In one embodiment, the purpose of generating this request is to discover and establish communication with a particular I/O node of multiple I/O nodes connected to the nexus.

In a subsequent operation 906, the requester initiates the performing of discovery of a desired I/O node connected to the nexus. In one embodiment, using the communication protocol level, the requester communicates with the desired I/O node and inquires as to the type of the I/O node. Once the I/O node receives this inquiry, it responds back to the requester revealing the type of the I/O node. For instance, in one embodiment, the I/O node may be a storage controller type device. Thereafter, in operation 907, the desired I/O node is enumerated by the requester inquiring as to the characteristics of the I/O node. For example, in one embodiment where the I/O node is a storage controller type device, the I/O node responds by enumerating its characteristics as follows: manufacturer, type, model, serial number, capabilities, software revision, and so on. In addition to storage controller type devices, other devices such as a device supporting NFS protocols, or a device supporting CIFS protocols can be used. Each of the devices supporting NFS protocols and CIFS protocols are preferably implemented to enable file system sharing. Once the requester has determined the type and characteristics of the I/O node, the method then moves to an operation 908 where the devices connected to the desired I/O node are enumerated. That is, again, using the communication protocol level, the requester asks the I/O node to itemize the type and characteristics of devices connected to the desired I/O node. In this manner, the discovery and enumeration operations of the embodiments of the present invention enable the requester to determine whether the requester would like to access any of the devices connected to the desired I/O node.

In one exemplary implementation, in operation 910, the requester communicates a "read" request to a particular device associated with the desired I/O node. This operation enables the requester to read some information stored on a particular device connected to the I/O node and to determine whether it would like to mount that specific device. Although in this embodiment the generated request is a "read" request, it must be noted that the generated request may be any type of file system request (e.g., input/output request, management type request, etc.). As the read request is issued by the requester file system, the request is in the format of the requester file system format. Thus, in one embodiment, prior to the request being transmitted to the I/O node over the nexus, the read request is manipulated such that the request would reveal the type of the requester operating system to the I/O node. Thus, in a subsequent operation 912, the "read" operation is received by an independent storage driver "ISD" layer resident in the requester computer file system. In one embodiment, the ISD layer is a software application executing on the requester computer, however, in a different embodiment, the ISD may be any layered or monolithic set of software modules that provide similar functionality. Subsequently, in operation 914, the request for communication to the I/O node over the nexus is supplemented. This task is achieved by the ISD layer manipulating the read request issued in the format of the requester computer file system, thereby supplementing and reformatting the request so as to carry and reveal the type of the requester computer file system format.

Figure 9B:
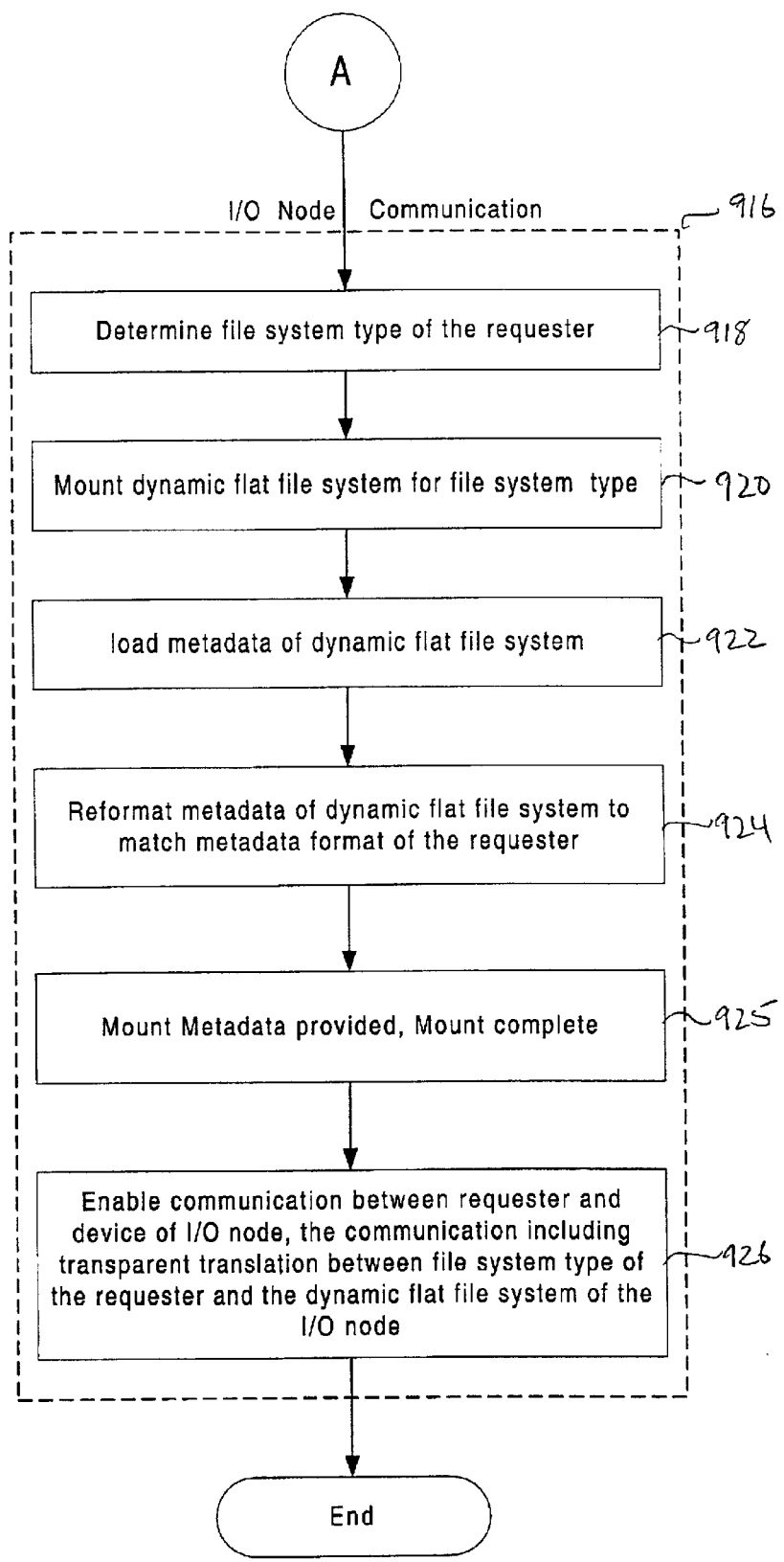
FIG. 9B is a flowchart illustrating an exemplary method of an I/O node communicating with a requester, in accordance with still another embodiment of the present invention.

Subsequently, in an operation 916 of FIG. 9B, the I/O node communicates with a requester, in accordance with one embodiment of the present invention. This operation starts with an operation 918 where the I/O node determines the file system type of the requester. In one embodiment, this task is achieved as a result of the ISD layer intercepting and supplementing the consumer file system request. That is, by intercepting and supplementing the issued request, the ISD layer informs the translator layer of the I/O node of the file system type of the requester. Thus, as of the time the ISD layer provides the type of the consumer file system to the I/O node, the I/O node associates that particular consumer with the communicated file system type.

Once the I/O node has determined the file system type of the requester, the I/O node continues to an operation 920 in which the dynamic flat file system for the requester type file system is mounted. In one embodiment, this is achieved by mapping the supplemented request to its substantially equivalent dynamic flat file request. For example, Unix type "read," "write," "mount," etc. requests are respectively mapped to their substantially equivalent dynamic flat file system "read," "write," "mount," etc. requests.

Continuing to an operation 922, the metadata of the dynamic flat file system is loaded. In one embodiment, this is accomplished by the translator layer reading the dynamic flat file system metadatasuperblock from the rotating media and then loading same into memory. In a subsequent operation 924, the metadatasuperblock of the dynamic flat file system is reformatted so as to substantially match the metadata format of the requester. That is, the metadatasuperblock of the dynamic flat file system is reformatted thus mimicking the format of the requester file system type. Then, the method continues to an operation 925 in which the provided metadata is loaded into the consumer memory, thus completing the mount request. In one embodiment, to accomplish this operation, the reformatted metadatasuperblock is shipped to the requester via the nexus, which in turn, is loaded and then mounted by the requester file system. Thus, in an operation 926, the method enables communication between requester and a device of the I/O node by transparently translating between the requester file system type and the dynamic flat file system of the I/O node.

Accordingly, the file system translator of the present invention advantageously facilitates simultaneous communication between consumer computers having different file systems and I/O nodes having resident translator layers. As the dynamic flat file system is configured to be a superset of substantially all known existing file systems, the file system translator has the capability to provide the same data about a file type object or a directory type object to multiple consumers each having a different file system without any of the consumers being aware that the file system type of the I/O node is not actually identical to the consumers.

For instance, in one exemplary embodiment, if a requester having a Unix type file system issues a "mount" request, the mount request is first interpreted by the ISD layer resident in the requester computer and is manipulated to reflect the type of the requester file system. Thereafter, the manipulated request is passed to the I/O node via a nexus. Thus, the translator layer resident in the I/O node receives the supplemented request and using same, determines the type of the requester file system as being Unix. Of course, Unix is only used herein as an example, and thus, the embodiment is applicable to any other file system. Knowing that the requester has a Unix type file system and that the request is a Unix type request, the I/O node then maps the Unix type mount request to a dynamic flat file system type mount request. Subsequently, the metadatasuperblock of the dynamic flat file system is loaded and reformatted such that it resembles a Unix superblock. This Unix superblock look alike is then shipped back to the requester so that it may be mounted, thus completing the mount request.

It must be noted that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data (e.g., a hard disk drive, multiple drives, RAID arrays, or any other type of media that can store data either locally or remotely), which can thereafter be read by a computer system. Examples of the computer readable medium include cache memory, read-only memory, random-access memory, optical media, magnetic tapes, arrays of disks, distributed storage, networked storage, logical and physical storage implementations, redundant array of inexpensive/independent disk/device (RAID) storage, and the like. The computer readable medium can also be distributed over network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A translation system for translating between nodes having heterogeneous file systems, comprising:
   a consumer node having a first file system, the consumer node including a driver for supplementing requests from the first file system to a storage device;
   an input/output (I/O) node implementing a second file system, the I/O node having the storage device connected thereto, the I/O node being in communication with the consumer node over a transport, the I/O node including,
      a translator layer, the translator layer being configured to map the supplemented requests from the first file system to the second file system and back to the first file system.

2. A translation system for translating between nodes having heterogeneous file systems as recited in claim 1, wherein the I/O node further comprises,
   a message handler, the message handler being configured to interface with the driver so as to filter I/O requests to the translator layer.

3. A translation system for translating between nodes having heterogeneous file systems as recited in claim 2, wherein the second file system is a dynamic flat file system, and the translator layer is interfaced between the dynamic flat file system and the message handler.

4. A translation system for translating between nodes having heterogeneous file systems as recited in claim 1, wherein the translator layer is configured to reformat a mounted metadata of the second file system such that the reformatted metadata substantially matches the metadata of the first file system.

5. A method for enabling communication between nodes having heterogeneous file systems, comprising:
   generating a request to communicate with a desired I/O node that is connected to a nexus;
   performing discovery of the desired I/O node;
   enumerating the desired I/O node;
   enumerating devices connected to the desired I/O node;
   communicating a read request to a particular device of the enumerated devices associated with the desired I/O node;
   intercepting the read request before communication over the nexus; and
   supplementing the read request for communication over the nexus to the particular device that is connected to the desired I/O node.

6. A method for enabling communication between nodes having heterogeneous file systems as recited in claim 5, wherein the performing of discovery of the desired I/O node comprises:
   determining the type of the desired I/O node.

7. A method for enabling communication between nodes having heterogeneous file systems as recited in claim 5, wherein the enumerating the desired I/O node comprises:
   determining the characteristics of the desired I/O node.

8. A method for enabling communication between nodes having heterogeneous file systems as recited in claim 5, wherein the enumerating devices connected to the desired I/O node comprises:
   determining the type of the devices connected to the desired I/O node; and
   determining the characteristics of the devices connected to the desired I/O node.

9. A method for enabling communication between nodes having heterogeneous file systems as recited in claim 5, wherein the supplementing the read request for communication over the nexus to the particular device that is connected to the desired I/O node comprises:
   manipulating the read request so as to create a supplemented request, the supplemented request being configured to carry a type of a file system of the node.

10. A method for enabling communication between nodes having heterogeneous file systems, comprising:
   receiving at an I/O node a request for communication from a consumer node;
   determining file system type of the consumer node to be a first file system;
   mounting a second file system at the I/O node;
   loading metadata for the second file system at the I/O node;
   reformatting the metadata of the second file system at the I/O node, the reformatting being performed to substantially match a metadata format of the first file system;
   sending the reformatted metadata to the consumer node so that the consumer node can mount the received metadata; and
   enabling communication between the consumer node and the I/O node, the reformatted metadata enabling transparent translation to and from the first file system and the second file system.

11. A method for enabling communication between nodes having heterogeneous file systems as recited in claim 10, wherein the determining the file system type of consumer node to be a first file system, comprises:

receiving the supplemented message from a driver resident at the consumer node; and analyzing the supplemented message by a translator layer so as to determine the type of the consumer node file system, the type of the consumer node file system being a first file system.

12. A method for enabling communication between nodes having heterogeneous file systems as recited in claim 10, wherein the mounting a second file system at the I/O node comprises:

mapping the supplemented request of a first file system to a translated request of the second file system, the meaning of the translated request configured to be substantially equivalent to the meaning of the supplemented request.

13. A method for enabling communication between nodes having heterogeneous file systems as recited in claim 10, wherein the I/O node can be one of a storage controller device, a device supporting NFS protocols, and a device supporting CIFS protocols, each of the devices for supporting NFS protocols and CIFS protocols being implemented for file system sharing.

14. A method for enabling communication between nodes having heterogeneous file systems as recited in claim 10, wherein the consumer node can be one of a personal computer, a work station computer, a network computer, a file server, a computer server, a web server, a wireless computer, and a personal digital assistant.

15. A method for enabling communication between nodes having heterogeneous file systems as recited in claim 10, wherein the second file system is a dynamic flat file system.

16. A method for enabling communication between nodes having heterogeneous file systems, comprising:

generating a request to communicate with a desired I/O node that is connected to a nexus by a consumer node;

performing discovery and enumeration of the desired I/O node;

communicating an I/O request to a particular device of the enumerated devices associated with the desired I/O node;

supplementing the I/O request for communication over the nexus to the particular device that is connected to the desired I/O node;

receiving at an I/O node a request for communication from a consumer node;

determining file system type of the consumer node to be a first file system;

mounting a second file system at the I/O node;

loading metadata for the second file system at the I/O node;

reformatting the metadata of the second file system at the I/O node, the reformatting being performed to substantially match a metadata format of the first file system;

mounting using the reformatted metadata by the consumer node; and enabling communication between the consumer node and the I/O node, the reformatted metadata enabling transparent translation to and from the first file system and the second file system.

17. A method for enabling communication between nodes having heterogeneous file systems as recited in claim 16, wherein the performing discovery and enumeration of the desired I/O node comprises:

performing discovery of the desired I/O node;

enumerating the desired I/O node; and enumerating devices connected to the desired I/O node.

18. A method for enabling communication between nodes having heterogeneous file systems as recited in claim 16, wherein the supplementing the I/O request for communication over the nexus to the particular device that is connected to the desired I/O node comprises:

receiving the I/O request before communication over the nexus; and manipulating the I/O request so as to create a supplemented request, the supplemented request being configured to carry a type of a file system of the consumer node.

19. A method for enabling communication between nodes having heterogeneous file systems as recited in claim 16, wherein the mount the reformatted data by the consumer node comprises:

sending the reformatted metadata to the consumer node by the I/O node;

loading the received reformatted metadata; and mounting using the loaded reformatted metadata.

20. A method for enabling communication between nodes having heterogeneous file systems as recited in claim 16, wherein the second file system is a dynamic flat file system.

* * * * *